(12) United States Patent
Kuncl et al.

(10) Patent No.: US 11,551,555 B2
(45) Date of Patent: Jan. 10, 2023

(54) NETWORK COMPUTER SYSTEM TO POSITION TRANSPORT PROVIDERS USING PROVISIONING LEVEL DETERMINATIONS

(71) Applicant: Uber Technologies, Inc., San Francisco, CA (US)

(72) Inventors: Parker Kuncl, San Francisco, CA (US); Ashley Quitoriano, San Francisco, CA (US); Awaneesh Verma, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 149 days.

(21) Appl. No.: 17/081,278

(22) Filed: Oct. 27, 2020

(65) Prior Publication Data

US 2021/0065555 A1 Mar. 4, 2021

Related U.S. Application Data

(63) Continuation of application No. 15/976,182, filed on May 10, 2018, now Pat. No. 10,839,695.
(Continued)

(51) Int. Cl.
*G08G 1/00* (2006.01)
*G06Q 10/06* (2012.01)

(52) U.S. Cl.
CPC ....... *G08G 1/202* (2013.01); *G06Q 10/06316* (2013.01); *G08G 1/205* (2013.01)

(58) Field of Classification Search
CPC .. G08G 1/202; G08G 1/205; G06Q 10/06316; G06Q 10/06311; G06Q 50/30; G06Q 10/047
See application file for complete search history.

(56) References Cited

U.S. PATENT DOCUMENTS 6,456,207 B1 9/2002 Yen
6,516,056 B1 2/2003 Justice et al.
(Continued)

FOREIGN PATENT DOCUMENTS

CN 106127329 11/2016
CN 106529703 3/2017
(Continued)

OTHER PUBLICATIONS

Yuan, J. Where to find my next passenger Proceedings of the 13th International Conference on Ubiquitous Computing—UbiCom '11 (2011).
(Continued)

*Primary Examiner* — Alan D Hutchinson
(74) *Attorney, Agent, or Firm* — Mahamedi IP Law LLP

(57) ABSTRACT

A computer system operates to receive transport service requests from computing devices of requesters within a geographic region. The system matches each transport service request with an available transport provider operating a service vehicle within the geographic region, and determines a location bias for a first transport provider that operates a corresponding vehicle within the geographic region, the location bias being associated with a preferred location of the first transport provider. The system may then match the first transport provider to a transport service request based on (i) the location bias of the first transport provider, and (ii) a destination of the transport service request which, upon fulfilling the transport service request, results in the first transport provider being positioned to arrive at the preferred location within a future time interval.

20 Claims, 5 Drawing Sheets

Related U.S. Application Data

(60) Provisional application No. 62/504,994, filed on May 11, 2017.

(56) References Cited

U.S. PATENT DOCUMENTS

| | | |
|---|---|---|
| 8,417,448 B1 | 4/2013 | O'Herlihy |
| 8,417,449 B1 | 4/2013 | Denise |
| 9,147,198 B2 | 9/2015 | Emans |
| 9,485,647 B2 | 11/2016 | Mohebbi |
| 2002/0034292 A1 | 3/2002 | Tuoriniemi et al. |
| 2002/0194129 A1 | 12/2002 | Furuya et al. |
| 2003/0187720 A1 | 10/2003 | Takada |
| 2004/0106399 A1 | 6/2004 | Ki |
| 2004/0219933 A1 | 11/2004 | Faith |
| 2004/0260470 A1 | 12/2004 | Rast |
| 2005/0234772 A1 | 10/2005 | Haruki |
| 2005/0251333 A1 | 11/2005 | Adamzyk |
| 2006/0059023 A1 | 3/2006 | Mashinsky |
| 2006/0217885 A1 | 9/2006 | Crady et al. |
| 2008/0270204 A1 | 10/2008 | Poykko |
| 2009/0254270 A1 | 10/2009 | Yu |
| 2010/0017275 A1 | 1/2010 | Carlson |
| 2010/0161392 A1 | 6/2010 | Ashby |
| 2011/0029658 A1 | 2/2011 | Werth |
| 2011/0153495 A1 | 6/2011 | Dixon |
| 2011/0307282 A1 | 12/2011 | Camp |
| 2012/0041675 A1 | 2/2012 | Juliver |
| 2013/0085819 A1 | 4/2013 | Gore |
| 2013/0246207 A1 | 9/2013 | Novak |
| 2013/0345961 A1 | 12/2013 | Leader |
| 2014/0011522 A1 | 1/2014 | Lin |
| 2014/0229255 A1 | 8/2014 | Scofield |
| 2015/0081362 A1 | 3/2015 | Chadwick |
| 2015/0161563 A1 | 6/2015 | Mehrabi |
| 2015/0161564 A1 | 6/2015 | Sweeney |
| 2015/0206267 A1 | 7/2015 | Khanna |
| 2015/0262430 A1 | 9/2015 | Farrelly |
| 2016/0017515 A1 | 6/2016 | Radhakrishan |
| 2016/0161275 A1 | 6/2016 | Waltermann |
| 2016/0247247 A1 | 8/2016 | Scicluna |
| 2016/0335576 A1 | 11/2016 | Peng |
| 2017/0011324 A1 | 1/2017 | Truong |
| 2017/0116566 A1 | 4/2017 | Walton |
| 2017/0193625 A1 | 7/2017 | Fan |
| 2017/0193826 A1 | 7/2017 | Marueli |
| 2017/0220966 A1 | 8/2017 | Wang |
| 2017/0227370 A1 | 8/2017 | O'Mahony |
| 2017/0323244 A1 | 11/2017 | Rani |
| 2017/0328725 A1 | 11/2017 | Schlesinger |
| 2018/0047091 A1 | 2/2018 | Ogden |
| 2018/0060990 A1 | 3/2018 | Liu |
| 2018/0109922 A1 | 4/2018 | Lin |
| 2018/0121847 A1 | 5/2018 | Zhao |
| 2018/0137594 A1 | 5/2018 | Marco |
| 2018/0197071 A1 | 7/2018 | Dong |
| 2018/0238705 A1 | 8/2018 | O'Herlihy |
| 2018/0330621 A1 | 11/2018 | Kuncl |
| 2018/0332450 A1 | 11/2018 | Chen |
| 2018/0336653 A1 | 11/2018 | Levi |
| 2019/0095965 A1 | 3/2019 | Stayner |
| 2019/0154454 A1 | 5/2019 | Verma |
| 2019/0271556 A1 | 9/2019 | O'Herlihy |
| 2020/0005198 A1 | 1/2020 | Nazerzadeh |
| 2020/0219220 A1 | 7/2020 | Levi |
| 2021/0065555 A1 | 3/2021 | Kuncl |
| 2021/0319380 A1 | 10/2021 | Camp |
| 2022/0170753 A1 | 6/2022 | Verma |

FOREIGN PATENT DOCUMENTS

| | | |
|---|---|---|
| WO | WO 2017/0016517 | 2/2017 |
| WO | WO 2017/0132447 | 8/2017 |

OTHER PUBLICATIONS

Office Action in EP 18799092.4 dated Feb. 1, 2022.
Mukai, Dynamic Location Management for On-Demand Car Sharing System, 2005, In: Khosia R., Howlett R.J., Jain L.C. (eds) Knowledge-Based Intelligent Information and Engineering Systems, KES 2005. Lecture Notes in Computer Science, vol. 3681. Springer, Berlin, Heidelberg, pp. 768-744 (2005).
ISR and Written Opinion dated Aug. 1, 2018 in PCT/US2018/0033863.
ISR and Written Opinion dated Aug. 27, 2018 in PCT/US2018/032360.
Written Opinion of IPEA in dated May 3, 2018 in PCT/US2018/032360.
ISR issued in PCT/US2018/052963 on Jan. 14, 2019.
IPRP in PCT/US2018/032360 dated Jul. 23, 2019.
IPRP in PCT/2018/033863 dated Aug. 26, 2019.
Singer, An App that Helps Drivers Earn the Most from Their Trips, New York Times, The New York Times, May 9, 2015.
Seow, K.T., "A collaborative multiagent taxi-dispatch system" IEEE Transactions on Automation science and engineering 7(3), 607-617, 2009.
IPRP in PCT/US2018/052963 dated Apr. 9, 2020.
EESR in EP 1899092.4 dated Sep. 21, 2020.

NETWORK COMPUTER SYSTEM TO POSITION TRANSPORT PROVIDERS USING PROVISIONING LEVEL DETERMINATIONS

RELATED APPLICATIONS

This application is a continuation of U.S. patent application Ser. No. 15/976,182, filed on May 10, 2018; which claims benefit of priority to Provisional U.S. Patent Application No. 62/504,994, filed May 11, 2017; the aforementioned applications being hereby incorporated by reference in their respective entireties for all purposes.

TECHNICAL FIELD

Examples pertain to a network computer system that utilizes provisioning level determinations to position service providers.

BACKGROUND

Network computer systems exist to provide various types of services using mobile devices. The services are sometimes de-centralized or distributed, causing inefficiencies to occur with respect to the use of resources, including computing resources.

Figure 1:
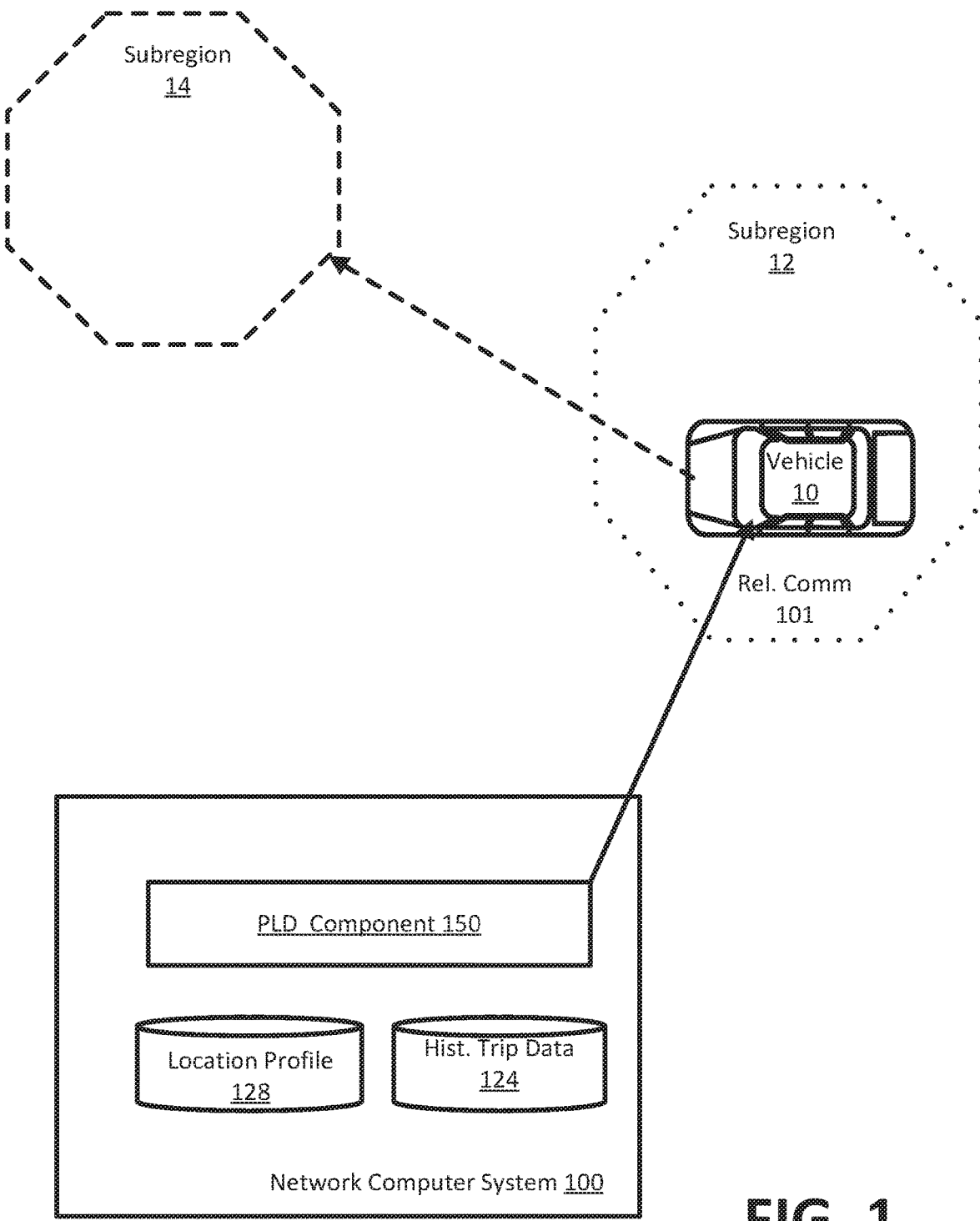
FIG. 1 illustrates a network computer system to manage the positioning of service vehicles in a geographic region.

Throughout the drawings, identical reference numbers designate similar, but not necessarily identical elements. The figures are not necessarily to scale, and the size of some parts may be exaggerated to more clearly illustrate the example shown. Moreover, the drawings provide examples and/or implementations consistent with the description. However, the description is not limited to the examples and/or implementations provided in the drawings.

DETAILED DESCRIPTION

A network computer system operates to estimate a quantity of service vehicles operating in a geographic region during a future time interval. For the future time interval, the network computer system determines a current forecast of a provisioning level for a service provided by the projected quantity of service vehicles in each of multiple subregions of the geographic region. The network computer system also determines a location bias for one or more service providers, each of the one or more service providers operating a corresponding vehicle within the given geographic region. Additionally, the network computer system matches each service provider to a service request based on (i) the location bias of the service provider, (ii) a service location of the service request, and (iii) a determination as to an effect of matching the service provider on the current forecast for the provisioning level.

Among other benefits, examples as described improve the efficiency in the manner in which service providers are distributed in a geographic area to provide service. For a given region, examples reduce metrics which represent cost to the network computer system, including costs associated with wait times by service providers and requesters. By reducing wait times, and monitoring provisioning levels over a geographic region, examples reduce the burden on computing resources which arrange services and perform other functions for service providers.

According to examples, data from service provider profiles may be determined and used for service providers in order to improve the service provider experience, while optimizing an objective of individual service providers (e.g., maximize service time, etc.). In some examples, the profiles for providers may be determined with respect to enabling a network computer system to determine a service plan for an individual provider. The service plan can identify preferred locations or regions of service providers, locations where service providers are scheduled or have a propensity to stop (or go off-duty), and/or times when service providers are to be at such locations. The service plan can implement positioning operations to position the service provider in select regions at times preceding when the provider is expected to arrive at the stopping locations.

In some implementations, the positioning operations can be selected to maximize an objective of the service provider (e.g., maximize service time), while facilitating the service provider in arriving at a stopping location identified by the provider's profile at an appropriate time. For example, the network computer system can determine a route and/or provide navigation information for the route to the service provider's device to maximize the objective of the service provider. Additionally, in variations, the positioning operations can also be selected to conform the service provider's experience to a preference for subregion and locations.

As used herein, a client device, a computing device, and/or a mobile computing device refer to devices corresponding to desktop computers, cellular devices or smartphones, laptop computers, tablet devices, etc., that can provide network connectivity and processing resources for communicating with a service arrangement system over one or more networks. In another example, a computing device can correspond to an in-vehicle computing device, such as an on-board computer. Also, as described herein, a user can correspond to a requester of a network service (e.g., a rider) or a service provider (e.g., a driver of a vehicle) that provides location-based services for requesters.

Still further, examples described relate to a variety of location-based (and/or on-demand) services, such as a transport service, a food truck service, a delivery service, an entertainment service, etc., to be arranged between requesters and service providers. In other examples, the system can be implemented by any entity that provides goods or services for purchase through the use of computing devices and network(s). For the purpose of simplicity, in examples described, the service arrangement system can correspond to a transport arrangement system that arranges transport and/or delivery services to be provided for riders by drivers of vehicles who operate service applications on respective computing devices.

One or more examples described provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

One or more examples described can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Some examples described can generally require the use of computing devices, including processing and memory resources. For example, one or more examples described may be implemented, in whole or in part, on computing devices such as servers, desktop computers, cellular or smartphones, and tablet devices. Memory, processing, and network resources may all be used in connection with the establishment, use, or performance of any example described herein (including with the performance of any method or with the implementation of any system).

Furthermore, one or more examples described may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates a network computer system to manage the positioning of service vehicles in a geographic region. A network computer system 100 such as shown by FIG. 1 can be implemented in a variety of computing environments, including as part of a network service provided through one or more servers. In some variations, the network computer system 100 is implemented as part of, or in connection with a service arrangement system, where, for example, operators use service vehicles to provide transportation-related services between locations. Still further, some examples provide for the network computer system 100 to be distributed using one or more servers and/or mobile devices.

As described with various examples, the network computer system 100 may position service vehicles (represented by service vehicle 10) in accordance with a desired provisioning level that is forecast for individual subregions 12, 14 of a geographic region. While FIG. 1 illustrates a single service vehicle 10 and two subregions 12, 14 for purposes of simplicity, the network computer system 100 can communicate with a plurality of vehicles in more than two subregions. The network computer system 100 may be implemented on a server, on a combination of servers, and/or on a distributed set of computing devices which communicate over a network such as the Internet. In some examples, the network computing system 100 is implemented using mobile devices of users, including service providers and requesters, with the individual devices executing a corresponding service application that causes the computing device to operate as an information inlet and/or outlet for the network computing system 100.

In some examples, the network computing system 100 includes a provisioning level determination component ("PLD component") 150 to forecast a provisioning level for one or more subregions where service vehicles operate to provide transport-related services. The network computing system 100 may forecast the provisioning level for a given future time frame based on (i) an estimated quantity of service vehicles which are expected to be available to requesters of the subregion, and (ii) an estimated quantity of service requesters in the subregion. The future time interval of the forecast may correspond to, for example, a duration of time measured from a current instance (e.g., next 10 minutes, next hour, etc.), or a duration of time that starts and stops in the future (e.g., between 12 pm to 1 pm). The estimated quantity of service providers may be determined from the historical trip data 124 for the geographic region, and a current or recent location of individual service providers. The estimated quantity of service requesters may be based on a quantity and location of service requesters (e.g., users who have made a service request within a designated time period), as well as the historical trip data 124.

As an addition or variation, the quantity and location of service requesters may be determined from a tabulation of users who are present in the relevant geographic region and whom are likely, based on their respective activity, to make a service request. For example, in determining the estimated quantity of service providers, the PLD component 150 may tabulate the number of users who have opened a service application for generating service requests for the network computing system 100. Each of the determinations for the estimated number of service providers and/or requesters can be tabulated for a given subregion or portion of the larger geographic region. Additionally, the historical trip data 124 may be maintained to various levels of granularity. For example, the historical trip data 124 can forecast hot spots for requesters (e.g., common or favorite locations of requesters), including a quantity of requests originating or specifying a particular service location to initiate service. The historical trip data 124 may also specify intervals in time when the increase in service requests may be expected.

Once the current forecast for the provisioning level for the given subregion is determined, the PLD component 150 may implement positioning operations to adjust the forecasted provisioning level to a desired provisioning level. The positioning operations may include sending communications to service providers to cause their positioning, in between times when the service providers are matched to service requests. As an addition or alternative, the positioning operations may include matching individual service providers to corresponding service requests which specify destinations that align with desired positioning targets.

According to some examples, the provisioning level may, for example, be represented by one or more parameters which the network computer system 100 can use to optimize for a service level objective. By way of example, a service level objective may correspond to the number of service requests which can be fulfilled in a given time period, and the determined service parameters may include one or more of (i) a time for an available service vehicle to be identified and assigned to an incoming service request, (ii) a time for an assigned service vehicle to arrive at a service location to initiate service for a requester, or (iii) a duration from when a service operator completes an assignment and receives a new assignment. For example, the PLD component 150 may forecast that a first subregion 12 is likely to be oversupplied with service vehicles at a future time interval, while a second subregion 14 is likely to be undersupplied with service vehicles. In this way, the first and second subregions 12, 14 provide examples of subregions where the provisioning level is not optimal.

The PLD component 150 can implement positioning operations to cause the first and second regions to improve their respective provisioning levels, such as to reduce the metric of oversupply in the first subregion 12 and the metric of undersupply in the second subregion 14. The determination of the desired provisioning level may be based on the service level objective, and subject to constraints or thresholds which include determining negative or positive impact (as measured through the use of service parameters) of a forecasted quantity of service vehicles as compared to the forecasted quantity of service requests. By way of example, the network computer system 100 may set a threshold of 5 minutes as the wait time for any request from a given location to receive a service vehicle. The network computer system 100 may initially forecast a provisioning level where, based on the anticipated number of service requests, the wait time may exceed 6 minutes, in which case the PLD component 150 may identify the subregion as being undersupplied. The PLD component 150 may then implement operations to adjust the current forecast of the provisioning level.

In some examples, the PLD component 150 adjusts the currently projected provisioning level through communications that alert, notify or otherwise motivate service providers to operate their respective service vehicles in a particular manner. For example, the PLD component 150 may select a set of service vehicles (represented by the service vehicle 10) to receive a set of positioning communications 101 that notify, instruct, or motivate the service providers to move their respective vehicles in a particular direction or along a particular road segment, when the service providers are in between service requests. As an addition or variation, the PLD component 150 may select individual service vehicles to perform actions such as to remain in a given subregion (e.g., parked) for a duration of time.

In variations, the PLD component 150 may adjust the currently projected provisioning level by weighting the matching of service requests to vehicles based on the destination where the service request is to be completed. The network computer system 100 may stitch a series of service requests for individual vehicles such that each successive destination of a completed service request is along a route or within a pre-selected region. For example, for a given service vehicle, the path formed by successive destinations can be designated in advance to pass through specific subregions of the geographic region.

In managing the service vehicles, the network computer system 100 may also account for location-based preferences of the corresponding operators for the service vehicles. The network computer system 100 may include a location profile store 128 that identifies location-specific preferences of the individual vehicle operators. The PLD component 150 can be used to limit positioning operations of the network computer system 100. (e.g., alerts, notifications, messages, offers, etc.).

As an addition or variation, the network computer system 100 may also optimize the selection of service providers individually, so as to maximize the objective of individual service providers (e.g., increased amount of service provided, minimize downtime, etc.). Thus, the PLD component 150 may, for example, weight selection of service vehicles for service requests that specify specific service locations in order to facilitate the respective operators in maximizing their objective.

Figure 2:
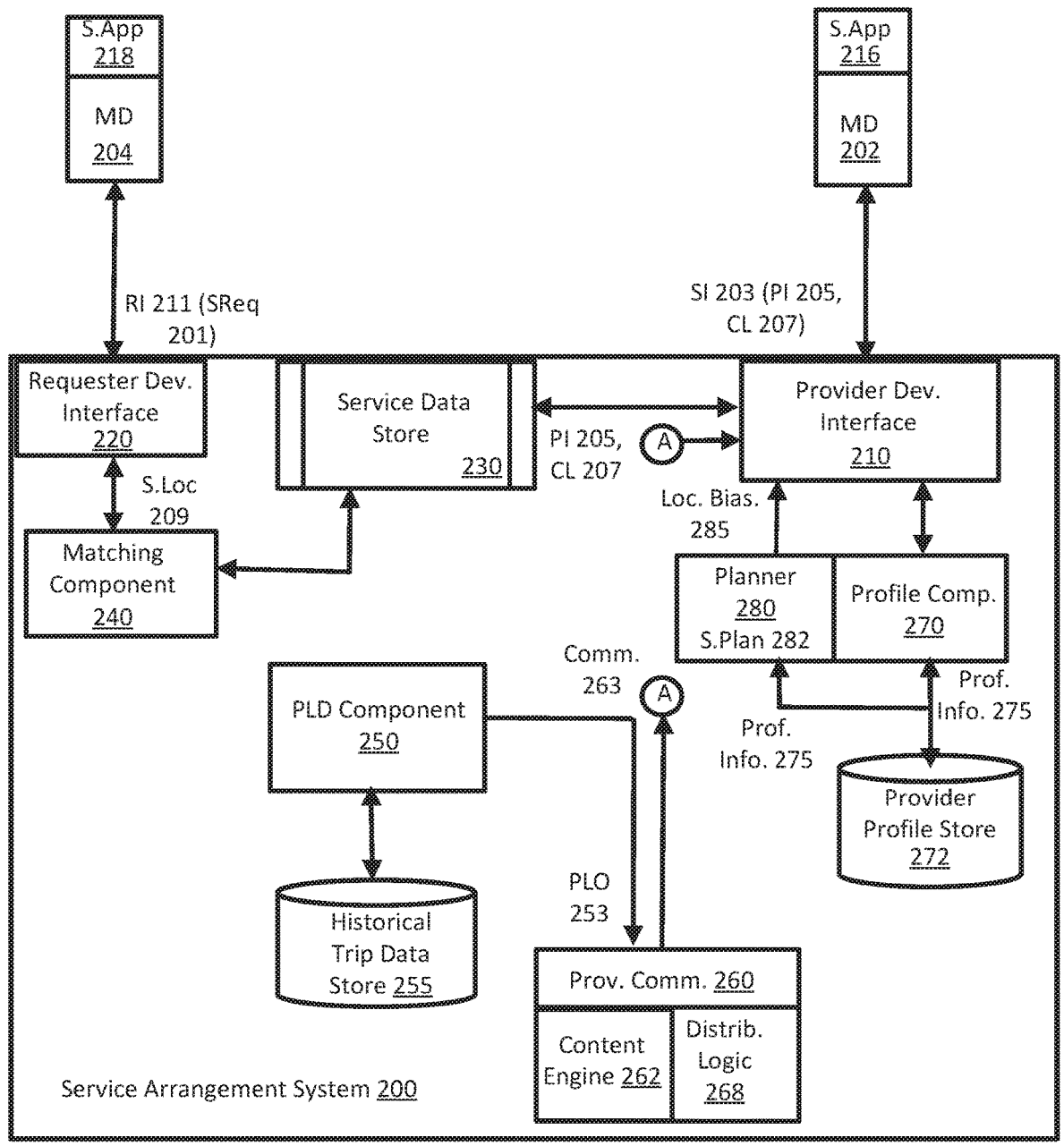
FIG. 2 illustrates an example of a service arrangement system which manages the positioning of service vehicles in a geographic region.

FIG. 2 illustrates an example of a service arrangement system which manages the positioning of service vehicles in a geographic region. According to examples, a service arrangement system 200 may be implemented as a network service, using, for example, a network computer system 100 such as described with an example of FIG. 1. In some examples, the system 200 implements a network platform, in connection with applications that run on mobile devices of the population of users. For a given geographic region, the users can include operators (or "service providers") of service vehicles, as well as requesters who receive a transport-related service.

With reference to FIG. 2, the system 200 includes a provider device interface 210, a requester device interface 220, a service data store 230 and a service matching component 240. The provider device interface 210 includes or performs processes that run on the network-side of the system 200 to establish communication channels with individual devices of service providers. For example, the device interface 210 can establish secure sockets with different types of mobile devices, which service providers of the system 200 can utilize when providing services using their respective vehicles. In some examples, the service providers operate mobile devices (represented in FIG. 2 by the mobile device 202) on which a corresponding service application 216 runs. Among other functionality, the service application 216 can automate operations which include indicating the availability of the service provider to provide service, communicate location information to enable the system 200 to monitor the location of the service provider's vehicle, receive information from the system 200 for facilitating the service provider in receiving service requests and fulfilling a service request, and communicate information to the system 200 for various purposes, including provisioning determination.

Likewise, the requester device interface 220 includes or performs processes that run on the network-side of the system 200 to establish communication channels with individual devices of requesters. The requesters may also operate mobile devices (represented in FIG. 2 by the requester device 204) on which a corresponding service application 218 runs. The requesters may operate respective service applications 218 to request transport-related services, such as human transport between a start location (or pickup location) and a destination (or drop-off). In variations, the types of services which may be arranged through the system 200 may include human transport, deliveries, shipping, and delivery of on-demand services (e.g., food trucks). The service application 218 may also provide information for use in enabling the system 200 with determining provisioning levels. For example, the service application 218 may communicate with the system 200 when the requester first opens the application, but before the service requester makes a request for service.

In some examples, the provider device interface 210 and the requester device interface 220 can each include or use an application programming interface (API), such as an externally provider-facing API, to communicate data with the provider and requester devices 202, 204, respectively. By providing the externally facing API, the system 200 can establish secure communication channels via secure access channels over the network through any number of methods, such as web-based forms, programmatic access via RESTful APIs, Simple Object Access Protocol (SOAP), remote procedure call (RPC), scripting access, etc.

According to some examples, the provider device 202 initiates communications with the system 200 using the service application 216. The service application 216 may correspond to a program (e.g., a set of instructions or code) that is downloaded and stored on the mobile device 202 of the service provider. The service provider can launch the service application 216 in order to utilize the system 200 to receive service requests, and the service provider may operate a service vehicle to fulfill assigned service requests. Once the communication channel is established, the provider device 202 may repeatedly or continuously communicate service information 203 to the system 200. The service information 203 may include the provider's identifier 205, and the provider's current location 207, which may be determined by the service application interfacing with a GPS component of the provider device 202.

The service data store 230 maintains the current location 207 of each active service provider at a particular moment. By way of example, each service provider may start a shift by operating the service application 216 (e.g., opening the application on the provider's device 202), and then toggling a state feature provided by the service application 216 to 'on duty'. The service application 216 communicates the activation of the state feature to the system 200 via the provider device interface 210. The provider device interface 210 processes the service information 203 received from individual service providers. For each service provider, the provider device interface 210 extracts the current location 207 and stores the current location with the provider's identifier 205 in the service data store 230. As the service provider's location changes (e.g., with movement of the service provider's vehicle), subsequent communications from the provider device 202 via the provider device interface 210 can be used to update the service data store 230. In this way, the service data store may reflect the most current location of each service provider.

The service data store 230 may also associate a service state with each provider. Initially, when the service provider goes on duty, the service provider may be associated with an available state. Once the service provider is matched to a service request, the associated state of the service provider may change, to reflect, for example, one more unavailable states (e.g., on-trip, on route to service start, etc.).

The requester device interface 220 receives requester information 211 from multiple requesters. The requester information 211 can identify the requester (e.g., by account), as well as provide the current location of the requester. The requester information 211 can be communicated with a service request 201. In some variations, at least some of the requester information 211 (e.g., current location) may be communicated before the service request 201 is communicated. The requester device interface 220 can parse individual service requests 201 to determine one or more service locations 209 of the service request, including the service start location and/or the service destination location.

In one implementation, the matching component 240 references the service location(s) 209 of an incoming service request 201 with the current location of available service providers, as provided by the service data store 230. In one example, that matching component 240 queries the service data store 230 for service providers that are within a first threshold distance (alternatively, within a threshold time of travel). From the queried result set, the matching component 240 makes a selection of a service provider for the service request 201. The service provider may receive the matched service request as an invitation, or the matched service request may be communicated as an automatic assignment.

Once the service provider is matched to a service request, the matching component 240 changes the service state associated with the selected service provider. For example, a service state of the service provider can be changed from available to unavailable, or from available to on-route to service start location. In the latter example, the service state may change again once service is initiated for the requester. For example, once the requester enters the service vehicle, the service state of the service provider may change to reflect that the service has initiated. Still further, the service provider may interact with the service application 216 to signal that the requester has entered the vehicle. Alternatively, the system 200 may monitor the service vehicle, in order to detect the service vehicle initiating a route towards a destination or other service location. Likewise, requester information 211 can be monitored to detect when the position of the requester device 204 is approximately the same as that of the service provider device 202, while the vehicle of the service providers in motion. Once the service state of the service provider is changed, the service provider can be excluded from possible selection until another event occurs to change the service state again. For example, the current trip for the service provider may complete, or the system 200 may detect when the service vehicle is nearing the destination, such that the service provider can be marked available for assignment to a new service request.

According to some examples, the system 200 includes a provisioning level determination component ("PLD component") 250 that determines a provisioning level for multiple subregions of a given geographic region. Additionally, the PLD component 250 may implement operations to influence positioning of service vehicles based on current and/or forecasted provisioning levels for individual subregions. In some implementations, the operations may be directed to actively modify provisioning levels of multiple subregions through positioning of service providers who are waiting for service requests. In variations, the operations of the PLD component 250 may be in connection with other system activities which seek to facilitate service providers on an individual basis. In such cases, the operations of the PLD component 250 may be to monitor for and prevent negative influence of such other activities which may be designed to improve the experience of the service providers on an individual basis. By way of example, the PLD component 250 be implemented in connection with system 200 actively positioning individual service providers to meet their respective preference or objective. The system 200 may, for example, use an output of the PLD component 250 to ensure that positioning a given service provider in a particular region does not cause an unwanted negative influence on the provisioning level of affected subregions.

In variations, the PLD component 250 can be implemented in connection with system 200 implementing positioning operations that further an objective of individual service providers, such as reducing or eliminating downtime. The system 200 may implement positioning operations to further the objective of individual service providers, subject to constraints determined by the PLD component 250 (e.g., assigning service providers to service requests which will terminate in a subregion that meets the preference or objective of the service provider). For example, the system 200 may implement a positioning operation for a given service provider, provided that the PLD component 250 does not forecast the positioning operation as negatively influencing the provisioning level of one or more affected subregions.

According to some examples, the positioning operations which may be performed by system 200 include (i) matching service providers to service requests based on the destination of the service requests, such that the individual service providers will be positioned in a given subregion once the service request is fulfilled, and (ii) generating communications for individual service providers to influence their decision making in maneuvering the service vehicle towards a particular direction or to a given area. As described with various examples, the system 200 may perform positioning operations for group or system level considerations, such as to optimize the provisioning levels of individual subregions to reduce requester wait time. As an addition or variation, the system 200 may perform positioning operations for individual service provider considerations, in order to meet a preference of the service provider as to locality where the service provider performs services (e.g., service provider has affinity or need to be positioned in subregion near particular location, etc.), or to further an objective of the individual service provider with respect to the quantity or duration of service time the service provider will provide in a given shift.

According to some examples, the provisioning level may reflect a comparative measure of service providers and requesters. A determination of the provisioning level may be made as either a current (e.g., real-time) determination, or as a forecasted determination for a future time interval. By way of example, the provisioning level may be implemented as a calculated set of parameters, which can reflect a current or future state of multiple subregions within a given geographic region. In some examples, the determination of the provisioning level can be represented by (i) the wait time for a service provider to be assigned to a new service request after completing a previous service request ("service provider wait time"), (ii) the wait time for a requester to be provided a service vehicle after making a request ("requester wait time"), and/or (iii) the wait time for an assigned vehicle to arrive at a service start location of a service vehicle ("time for service vehicle to reach service start location"). In variations, other parameters can be used to reflect the provisioning level of a given geographic region, such as, for example, a ratio of service vehicles (or available service vehicles) to requesters. Still further, the provisioning level may be represented as a score for individual subregions. When the provisioning level is calculated for the current state of a given geographic region, the wait times may reflect an average based determination. When the provisioning level is calculated for a future interval of time, the respective wait times may reflect an expected wait time, for individual drivers within the subregion.

By way of example, the provisioning level may reflect oversupply of service providers when the service provider wait time exceeds a predetermined threshold. The provisioning level may reflect undersupply of service providers when the requester wait time and/or the time for service vehicle to reach service start location exceed predetermined thresholds. As additions or variations, other parameters may reflect the provisioning level of a subregion, such as the ratio of available service vehicles to requesters.

The PLD component 250 may determine the provisioning level for a subregion, or multiple subregions of a geographic region. In some variations, the subregions of a geographic region may be predefined. Still further, in some examples, the PLD component 250 may determine the provisioning level for a current time interval, and determine a current forecast for the provisioning level for a future time interval. The future time interval may extend from the current time to a future time (e.g., for X minutes in the future). Alternatively, the future time interval may correspond to a time interval that starts and ends in the future (e.g., between 12 pm to 1 pm each day).

As described with various examples, the system 200 may implement operations that result in a change in the provisioning level of individual subregions. The PLD component 250 may repeatedly determine the provisioning level at the current time interval and/or as a forecast for the future time interval, in order to accurately monitor and update the metrics of the provisioning levels when changes in the quantity of the service providers and/or requesters occur.

In forecasting the provisioning level for a future time interval, the PLD component 250 may utilize historical trip data, such as provided from trip data store 255. The trip data store 255 may identify, for example, the number of requesters that have historically been present in a given subregion over a comparative time period. Likewise, the trip data store 255 may identify the number of service providers which have historically been available in or near a given subregion. The service data store 230 may also provide inputs from the current state of the geographic region for use in forecasting. Such inputs may include a current number of service vehicles (e.g., active (e.g., on-duty) service providers), a current number of requesters, and the current location or subregion of the currently active service providers and/or requesters. In some examples, the PLD component 250 can extrapolate or model a current projection of the provisioning level for a future time interval in each of multiple subregions of a given geographic region, using the historical trip data store 255 and inputs determined from the service data store 230 regarding the current numbers of service providers (or their respective vehicles) and requesters (e.g., including users who have open service requests, as well as users who have opened the service application 218 on their respective mobile device 204 but have not yet generated a service request). In determining a current forecast of the provisioning level for a future time interval, the PLD component 250 may forecast the quantity of service vehicles for the future time interval, based on the current number of service vehicles and the historical trip data store 255. The PLD component 250 may also forecast the quantity of requesters, based on the current number of requesters and the historical trip data store 255.

In some examples, the PLD component 250 implements positioning operations to actively influence distribution of available service provider vehicles in a geographic region based on current and forecasted provisioning levels of individual subregions. The PLD component 250 may communicate a provisioning level output 253 to a provider communication sub-system 260, which in turn generates communications that are intended to cause providers to voluntarily move their vehicles to or towards a particular subregion. In some examples, the provisioning level output includes a score that reflects the adequacy of the provisioning level for multiple subregions of a geographic region. The score may also reflect a value for individual service providers, reflecting for example, a measure of likely downtime should the service provider position his or her vehicle in the corresponding subregion. Still further, the score may reflect a value of the subregion to a current and active set of service providers, where the value is based on potential earning which may be achieved by service providers (e.g., based on a number of service requests assigned to the service providers) over a time interval of the forecast. In some examples, the provisioning level output 253 includes one or more metrics which are specific for a current provisioning level, and/or a current forecast of the provisioning level for an upcoming interval.

The provider communication sub-system 260 can use the provisioning level output 253 to generate one or more types of communications 257 which are communicated to the mobile devices 202 of service providers via the provider device interface 210. The communications may cause service providers to take action that improves the provisioning level at one or more subregions of the geographic region. By way of examples, the communications 257 can be in the form of messages (e.g., in app messages or pushed content), notifications or alerts, and the content of the communications can specify a particular location, subregion or direction of travel. In some examples, the communications 257 can be in the form of non-textual alerts, such as audible sounds, lighting effects or other audiovisual output which serve as a hint or indirect communication regarding a particular road, direction or action a service provider should take.

In some implementations, the provider communication sub-system 260 uses the provisioning level output 253 to implement a set of group or system level positioning operations. The group or system level positioning operations can include generating communications, in the form of recommendations or suggestions, to groups of service providers in order to influence the positioning of the service providers in a manner that positively affects the provisioning level of one or more subregions.

In one implementation, the provider communication sub-system 260 includes a content engine 262 which generates content for service providers to accomplish a desired migration in the positioning of service providers. In order to implement a desired shift or migration, the content engine 262 may generate communications 263 that include content indicating a direction, subregion or specific location which individual service provider should travel to while waiting for service requests. The provider communication sub-system 260 may also include distribution logic 268, which implements a process or protocol to communicate the generated content to cause a desired level of positioning by service vehicles. For example, the content engine 262 may generate communications 263 in the form of a recommendation (e.g., "Market and 5th Street does not have enough providers"), for delivery to a group of service providers in the vicinity of the recommended location. The communication 263 may cause at least some recipient service providers to reposition themselves prior to receiving their next service request. The distribution logic 268 can send the communications to the group of service providers via the provider device interface 210, and then monitor the location of the recipient service providers via the service data store 230. Based on the response rate to the communication, the distribution logic 268 can send the communication to additional service providers in a next time interval (e.g., 2 minutes later) until a desired level of positioning is achieved.

In some examples, the content engine 262 generates the communication 263 as a recommendation for individual service providers, where the content is intended to further the objective of the service provider (e.g., increase total service time or reduce downtime). In some implementations, the communication 263 may be generated for individual service providers, using profile information 275 of the service provider. For example, the profile information 275 may indicate that a service provider is a high-earner, and the provider communication sub-system 260 may generate the communication 263 to further the objective (as determined from the profile information 275) of the service provider to maximize the service provider's earnings. The communication 263 may recommend a specific subregion where the service provider can position his or her service vehicle (when waiting for a next assignment) to reduce the service provider wait time. In variations, the content engine 262 may generate the communication 263 to include an offer, where the service provider receives an award for positioning his or her service vehicle in a particular subregion during a particular time interval. Still further, the communication 263 may be provided as a notification or alert, such as a visual map alert, audible alert, or other audio/visual media which can prompt or hint the service provider to move the vehicle in a particular direction, or to a particular subregion.

The PLD component 250 may determine when the provider communication sub-system 260 may generate recommendations to further the objective of the individual service providers. Alternatively, the provider communication sub-system 260 may distribute individual recommendations for service providers based on the output of the PLD component 250. The PLD component 250 can forecast the provisioning level of individual subregions to preclude (or limit) instances in which, for example, positioning of the service provider in accordance with a recommendation (or preference) would likely detriment the provisioning level of one or more subregions. The basis for determining that an individual (or group) of recommendations would detriment the provisioning level of one or more subregions may be provided by the PLD component 250 calculating forecasts of one or more provisioning level metrics, such as before and after service provider wait times. By way of example, if the provisioning level metric(s) resulting from the positioning of the service provider(s) in the forecast differ from the current forecast of the provisioning level by more than a threshold value, the PLD component 250 may preclude a given recommendation or set of recommendations from being communicated to the operators.

In some examples, system 200 includes a profile component 270 to continuously develop profile information about service providers. The profile component 270 may include a profile data store 272 which maintains profile information 275 for service providers who are active in the geographic region. The profile information 275 may be specific to geolocation, to identify, for example, preferred subregions of an individual service provider, and/or preferred locations where the service provider pauses or ends a shift. The location preferences for individual service providers may be developed over time. The profile component 270 can monitor individual service providers to determine, for example, favorite locations or subregions of individual service providers. Additionally, the profile component 270 may identify previous "best days" for the service provider. As an addition or variation, the profile component 270 may identify common locations where the service provider stops to take a shift or takes a break. Additionally, the profile component 270 may monitor the service data store 230, for example, to determine a common or frequent final location of the service provider's shift. The profile component 270 may also determine timing information associated with the shift end of the individual service provider. The timing information may be based on, for example, a typical duration or stopping time when the service provider stops a shift.

In some examples, the profile component 270 can also utilize data generated from the mobile devices 202 of the service providers, in order to determine stopping locations where the provider is likely going to stop or pause a shift. For example, the profile component 270 may interface with the service application 216 of the mobile devices 202 in order to obtain a calendar data set for the provider. The calendar data set may identify appointments or other events which are likely to signify stop or pause locations of the provider. The profile component 270 may update the profile information 275 of each active service provider, based on monitoring the behavior of the individual service providers, as well as retrieving calendar or other relative data set to determine the location preferences or likely service stops of the service provider.

In some examples, the system 200 may include planning logic 280 to determine a location bias 285 for individual service providers. For individual service providers, the location bias 285 corresponds to an area or location that is advantageous for the particular service provider to be located in at a particular time period, given the service provider's location profile (e.g., preferred subregion and/or likely service destination) or objective. The planning logic 280 may repeatedly determine and store the location bias 285 with the current location 207 of the provider in the service data store 230. The location bias 285 may influence the service requests which the particular service provider is matched with. In some examples, the location bias 285 is stored as a weight or condition that promotes (or makes more likely) a service request match when the service request specifies a destination location that is within an area of the location bias 285.

In one implementation, the planning logic 280 determines the location bias 285 for the provider based on the provider's likely stopping location and time, as provided from the location profile 275 of the provider. In such examples, the location bias 285 may be associated with the assumed stopping location and time. The location bias 285 may reflect an area or band about the assumed (or likely) stopping location of the provider, where the separation distance of the location bias 285 from the stopping location is based on travel time for the provider's vehicle to travel to the stopping point in a given time period set by the likely stopping time. For a given stopping location and time, the location bias 285 of the service provider can be a dynamic determination, in that the location bias 285 may change based on the current location of the service provider and the time remaining until the likely stopping time. In some examples, as the time of the likely service stop nears, the location bias 285 may be implemented as a band that is separated from the stopping location by a distance that is approximately the same as an expected trip distance for an expected service request that can be matched to the service provider prior to the stopping time. For example, an objective for implementing the location bias 285 may be to locate the service provider in a region that is one service hop (e.g., the next matched service request) from an area that is near the stopping location.

As an addition or alternative to determining location bias 285 from distance, some examples may identify the location bias based on assumptions of, for example, trip distance. For example, the planning logic 280 may predict (e.g., using historical trip data store) that a given service provider can, when positioned in a more distance subregion (target subregion) relative to the stopping location as compared to a current subregion, be matched to a single service request that can place the service provider adjacent to a likely stopping location prior to the expected stopping time. The planner 280 may then implement a service plan 282 to position the service provider after fulfillment of service requests along a path that will position the service provider in the target subregion, with adequate time to match the service provider to a service request that that will position the service provider near the likely stopping location, before the expected stopping time. The planner 280 may implement the service plan 282 by associating the service provider with location bias to promote (or make more likely) the matching component 240 selecting the service provider for service requests which have destinations along the path of the service plan.

In some examples, the planner 280 generates the service plan 282 for the individual service provider to specify a set of successive target areas or subregions and corresponding target time intervals. The planning logic 280 may associate the service provider with location bias 285 which corresponds to the target areas. The location bias 285 for each target area may be associated with the service provider in the service data store 230 at selective time intervals that precede the target time interval by a duration predicted for matching the service provider to a suitable request and to have the service provider fulfill the service request (e.g., time for service provider to pickup and drop-off requester). In this way, the individual service provider can be selectively positioned throughout the time period when the service provider is on-duty. In some examples, the service plan may be devised to further an objective of the service provider (e.g., maximize the number of service requests received by the service provider), as well as to satisfy one or more preferences of the service provider (e.g., service provider prefers to be located at a particular subregion during a portion of their respective shift). The implementation of the service plan 282 may also be subject to the output of the PLD component 250. In some examples, the PLD component 250 may preclude or limit implementation of the service plan 282 if a resulting provisioning level forecast is deemed detrimental (e.g., service request wait time exceeds threshold as a result of positioning a service provider according to a service plan 282).

According to some examples, the planning logic 280 can select a service plan 282 which is based on, for example, a best day of the service provider, or other service provider criteria. The service plan 282 may be anchored by locations in the day where the provider is required to be, at a particular time (e.g., provider may need to be near child's school at 3 PM to pick child up). The service plan 282 may then define location bias 285 for the provider, based on inputs such as the current location of the provider, the preferences of the service provider, and the service provider's objective (e.g., eliminate downtime or maximize earnings). The service provider may also be provided communications 263 (e.g., turn by turn instructions) from the communication subsystem 260, so that the provider does not have to guess where to position him or herself during the times between when the provider arrives at the stopping locations.

In some variations, the location bias 285 may also be identified from an objective of the service provider. For example, the objective of the service provider may be to maximize matched service requests, or alternatively, revenue from matched service requests. The location bias 285 may identify the service destination in an area or subregion where the service provider can expect to maximize his or her objective.

Still further, the location bias 285 may also be identified from a preference of the service provider to be located in specific regions or subregions. The location bias 285 may weigh the selection of matched requests for the service provider in order to weight the service provider to receive his or her preference in terms of matched selections.

The matching component 240 may operate to use the service data store 230 to match the service providers with incoming service requests 201. The location bias 285 may be reflected by geographic information associated with the identifier of the service provider in the service data store 230. The matching component 240 can use the geographic information of the location bias 285 as a condition and/or weight, such that the matching component 240 is influenced to a match the service provider to a service request that specifies a destination that satisfies the geographic information of the location bias 285. Without consideration of location bias, the matching component 240 can match the service provider to individual service requests based primarily on a proximity of the current location 207 of the service provider's vehicle, and the service start location specified by a newly received service request. When location bias 285 is used, the matching component 240 may match the service provider to a service request based on the proximity of the service provider's current location to the service start location and the relative proximity of the service request's destination with the geographic information of the location bias 285.

Figure 3:
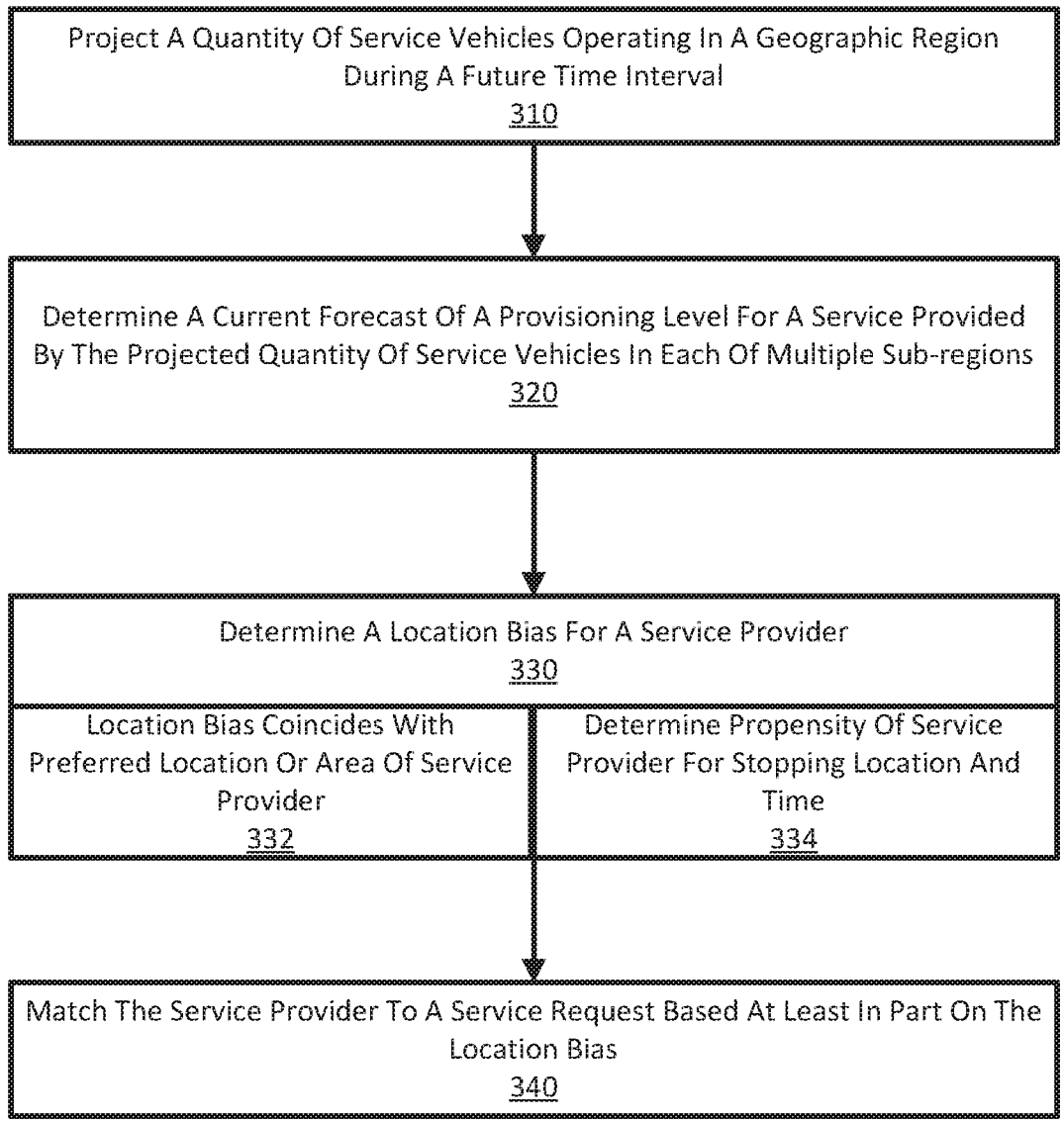
FIG. 3 illustrates an example method for positioning service providers in a geographic region using location bias.

FIG. 3 illustrates an example method for positioning service providers in a geographic region using location bias. In describing an example of FIG. 3, reference may be made to elements described with other figures for purpose of illustrating a suitable component or element for performing a step or sub-step being described.

With reference to an example of FIG. 3, the system 200 project a quantity of service vehicles operating in a geographic region during a future time interval (310). The projection may be based at least in part on a current number of service vehicles in the geographic region. Additionally, the projection may be based on historical data, such as the number of service vehicles who were available at a similar day or time in the past. In one implementation, the current number of service vehicles may be extrapolated for the future time interval based on a predictive model developed from the historical data.

The 200 may determine a current forecast of a provisioning level for a service provided by the projected quantity of service vehicles in each of multiple subregions (320). The current forecast for the provisioning level may be determined by also estimating a current and/or projected number of requesters in each of the multiple subregions. In determining requesters, historical data may also be used for corresponding dates and times in recent past. Additionally, requesters can be determined from both the number of open service requests, and the number of users who have the corresponding service application 218 open on their respective mobile devices 204.

The system 200 determines a location bias for a service provider operating a vehicle within a given geographic region (330). The location bias may correspond to a region, area or location which can serve a preference or objective of the service provider. The location bias for a given service provider may provide a weight or condition for matching service requests to the service provider based on the destination.

In some examples, the location bias may be selected to coincide with a preferred location or area of the service provider (332). In particular, system 200 may determine the preference, propensity or likelihood of the service provider to be a specific location that is time-dependent (e.g., location where service provider wants to be at a particular time). Still further, the location bias includes a location or subregion which is within the distance or time of travel for allowing the service provider to arrive the preferred location before the preference location time. The system 200 may determine the location bias to include subregions or areas which the service provider can operate in, while subsequently being able to position the service provider at or near the specific location at the relevant time period. In some examples, the location bias may also identify those areas or regions where positioning of the service vehicle optimizes an objective of the service provider (e.g., decreases the wait time between service requests for the service provider).

According to some examples, system 200 may determine the propensity or preference of the service provider as to stopping locations and times (334). For example, the system 200 may determine a preference or propensity for the service provider to stop service (e.g., go off duty) at a particular time. For example, the service provider may have a preference to stop service at a particular location and time for a personal appointment. The system 200 can learn the propensity of the service provider, and then plan the location bias for the service provider so that the service provider is near the stopping location at the particular time. The system 200 can learn of the propensity of the service provider by observing the service provider for a period of time.

In variations, the system 200 may (e.g., using the service application) interface with a calendar to determine appointments for the service provider. The system 200 can then selectively determine the location bias at various times through the day for the service provider, so that the service provider maintains a path or direction that places the service provider at a specified location and at a scheduled time. The system 200 may also position the service provider through location bias and matching, so that the service provider is optimizing a desired objective while being receiving consecutive matched assignments that drift the service provider towards a likely or preferred stopping location.

In some examples, the system 200 may match the service provider to a service request based at least in part on the location bias (340). In particular, the system 200 may match the service request based on (i) the location bias of the service provider, (ii) a service location of the service request, and/or (iii) a determination as to an effect of matching the service provider on the current forecast for the provisioning level. In some examples, the location bias can specify an area or subregion which is associated with the service provider in the service data store 230. The matching component 240 may match or weight selection of the service provider for service requests that satisfy both a service start and destination location.

Hardware Diagram

Figure 4:
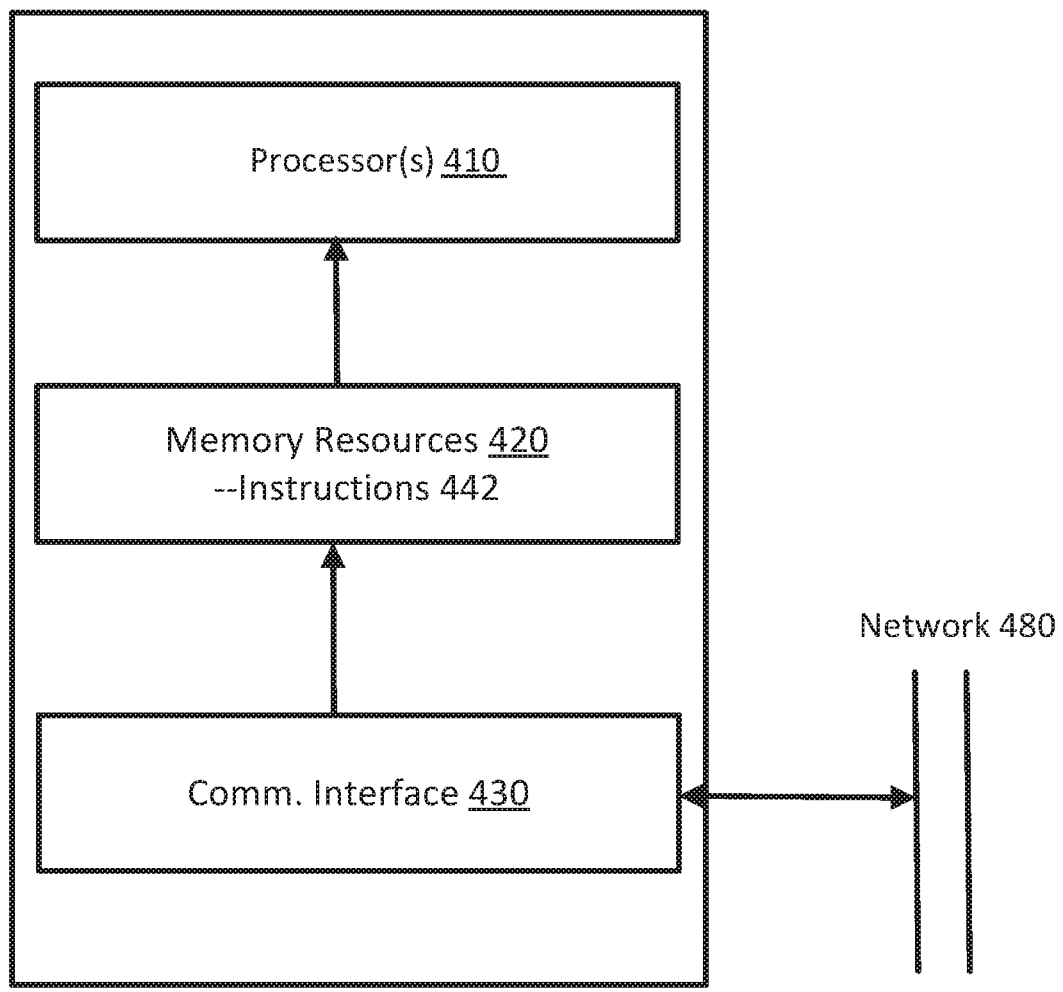
FIG. 4 is a block diagram that illustrates a computer system on which examples described herein may be implemented.

FIG. 4 is a block diagram that illustrates a computer system upon which one or more embodiments described herein may be implemented. For example, in the context of FIG. 1 and FIG. 2, the network computing system 100 and service arrangement system 200 may be implemented using a computer system or combination of computer systems, such as described by FIG. 4.

In one implementation, the computer system 400 includes one or more processors 410, memory resources 420, and a communication interface 430. The computer system 400 includes at least one processor 410 for processing information. The memory resources 420 may include a random access memory (RAM) or other dynamic storage device, for storing information and instructions to be executed by the processor(s) 410. The memory resources 420 also may be used for storing temporary variables or other intermediate information during execution of instructions to be executed by the processor(s) 410. The computer system 400 may also include other forms of memory resources, such as static storage devices for storing static information and instructions for the processor 410. The memory resources 420 can store information and instructions, including instructions 442 for determining provisioning levels and positioning operations, in order to implement, for example, the service arrangement system 200. Additionally, the processor(S) 410 can execute the instructions 442 to implement a method such as described with an example of FIG. 3.

The communication interface 430 can enable the computer system 400 to communicate with one or more networks 480 (e.g., cellular network) through use of the network link (wireless or wireline). Using the network link, the computer system 400 can communicate with one or more other computing devices and/or one or more other servers or data centers. In some variations, the computer system 400 can receive service requests from requester devices via the network link 480. Additionally, the computer system 400 can receive information from provider devices, from which forecasts of provisioning levels, location bias and other aspects described herein may be determined.

Examples described herein are related to the use of the computer system 400 for implementing the techniques described herein. According to one embodiment, those techniques are performed by the computer system 400 in response to the processor 410 executing one or more sequences of one or more instructions contained in the memory resources 420. Such instructions may be read into the memory resources 420 from another machine-readable medium, such as the storage device. Execution of the sequences of instructions contained in the memory resources 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

Figure 5:
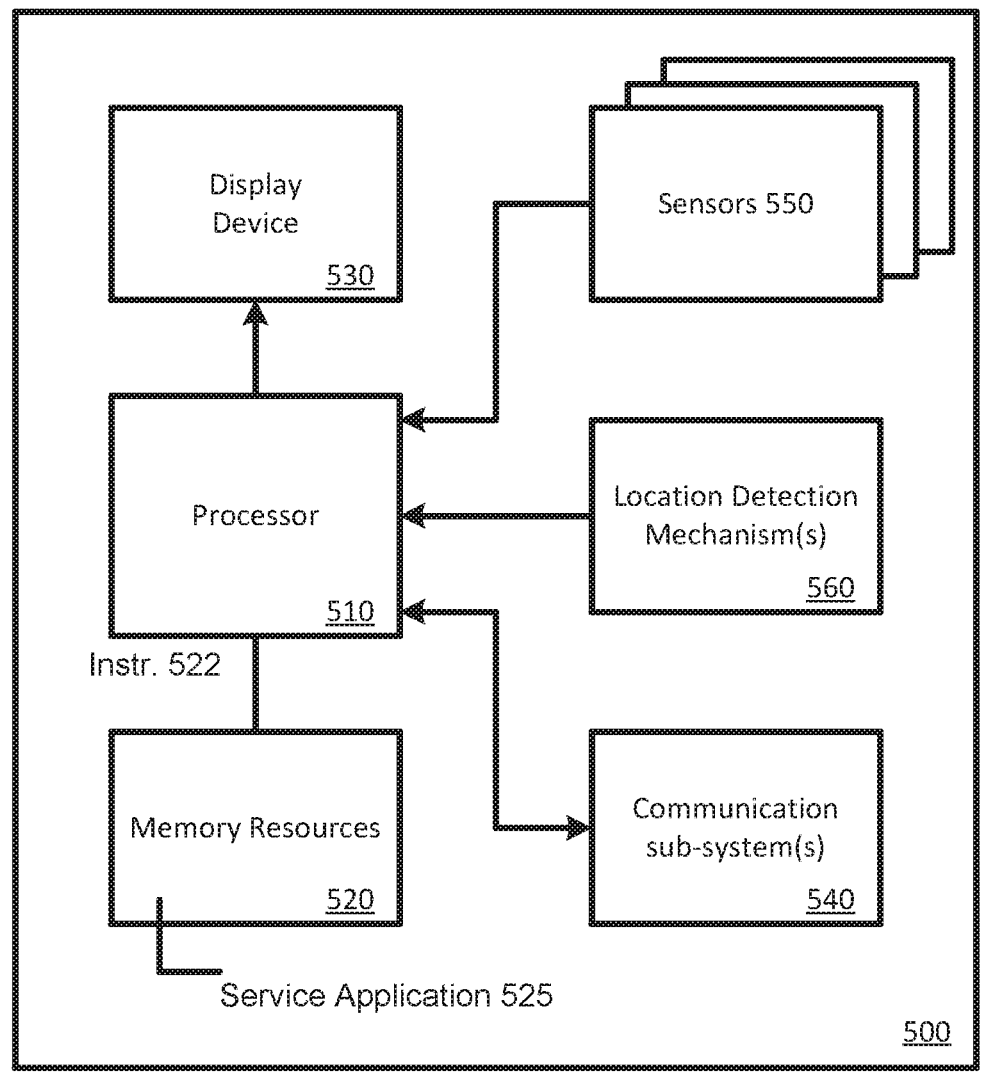
FIG. 5 is a block diagram that illustrates a computing device upon which examples described herein may be implemented.

FIG. 5 is a block diagram that illustrates a computing device for use with some examples as described herein. In one embodiment, a computing device 500 may correspond to a mobile computing device, such as a cellular device that is capable of telephony, messaging, and data services. The computing device 500 can correspond to a device operated by a requester or, in some examples, a device operated by the service provider that provides location-based services (e.g., provider device 202 and requester device 204). Examples of such devices include smartphones, handsets, tablet devices, or in-vehicle computing devices that communicate with cellular carriers. The computing device 500 includes a processor 510, memory resources 520, a display device 530 (e.g., such as a touch-sensitive display device), one or more communication sub-systems 540 (including wireless communication sub-systems), one or more sensors 550 (e.g., accelerometer, gyroscope, barometer, altimeter, microphone, camera), and one or more location detection mechanisms (e.g., GPS component) 560. In one example, at least one of the communication sub-systems 540 sends and receives cellular data over data channels and voice channels. The communications sub-systems 540 can include a cellular transceiver and one or more short-range wireless transceivers. The processor 510 can exchange data with a service arrangement system (not illustrated in FIG. 5) via one of the communications sub-systems 540.

The processor 510 can provide a variety of content to the display device 530 by executing instructions stored in the memory resources 520. The memory resources 520 can store instructions for the service application 525. For example, the processor 510 is configured with software and/or other logic to perform one or more processes, steps, and other functions described with mobile computing devices of occupants of vehicles. In particular, the processor 510 can execute instructions and data stored in the memory resources 520 in order to execute a service application, such as described with various examples. In one example, the processor 510 may execute instructions 522 to communicate with and receive recommendations, notifications and/or alerts from the service arrangement system.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A computer system comprising:
   memory storing a set of instructions;
   one or more processors that access the memory, and execute the instructions, causing the computer system to:
   receive, over one or more networks, transport service requests from computing devices of requesters within a geographic region;
   match each transport service request with an available transport provider operating a service vehicle within the geographic region;
   determine a location bias for a first transport provider that operates a corresponding vehicle within the geographic region, the location bias being associated with a preferred location of the first transport provider; and
   match the first transport provider to a transport service request based on (i) the location bias of the first transport provider, and (ii) a destination of the transport service request which, upon fulfilling the transport service request, results in the first transport provider being positioned to arrive at the preferred location within a future time interval.

2. The computer system of claim 1, wherein the executed instructions cause the computer system to determine the location bias to further an objective of the first transport provider.

3. The computer system of claim 2, wherein the objective of the first transport provider comprises maximizing a number of transport assignments that the first transport provider receives over a given time period.

4. The computer system of claim 2, wherein the objective of the first transport provider comprises maximizing revenue for the first transport provider over a given time period.

5. The computer system of claim 1, wherein the executed instructions cause the computer system to determine the preferred location indicated in the location bias based on at least one of a distance or a time of travel from the preferred location.

6. The computer system of claim 1, wherein the executed instructions cause the computer system to determine the location bias for the first transport provider by determining a preference location time when the first transport provider is to be at the preferred location.

7. The computer system of claim 6, wherein the location bias for the first transport provider comprises a location or subregion that is within at least one of a distance or a time of travel for allowing the first transport provider to arrive at the preferred location before the preference location time.

8. The computer system of claim 1, wherein the executed instructions cause the computer system to determine the location bias by determining a stopping location and a stopping time for the first transport provider, and wherein the location bias changes as the stopping time approaches.

9. A non-transitory computer-readable medium storing instructions that, when executed by one or more processors of a computer system, causes the computer system to:
  receive, over one or more networks, transport service requests from computing devices of requesters within a geographic region;
  match each transport service request with an available transport provider operating a service vehicle within the geographic region;
  determine a location bias for a first transport provider that operates a corresponding vehicle within the geographic region, the location bias being associated with a preferred location of the first transport provider; and
  match the first transport provider to a transport service request based on (i) the location bias of the first transport provider, and (ii) a destination of the transport service request which, upon fulfilling the transport service request, results in the first transport provider being positioned to arrive at the preferred location within a future time interval.

10. The non-transitory computer-readable medium of claim 9, wherein the executed instructions cause the computer system to determine the location bias to further an objective of the first transport provider.

11. The non-transitory computer-readable medium of claim 10, wherein the objective of the first transport provider comprises maximizing a number of transport assignments that the first transport provider receives over a given time period.

12. The non-transitory computer-readable medium of claim 10, wherein the objective of the first transport provider comprises maximizing revenue for the first transport provider over a given time period.

13. The non-transitory computer-readable medium of claim 9, wherein the executed instructions cause the computer system to determine the preferred location indicated in the location bias based on at least one of a distance or a time of travel from the preferred location.

14. The non-transitory computer-readable medium of claim 9, wherein the executed instructions cause the computer system to determine the location bias for the first transport provider by determining a preference location time when the first transport provider is to be at the preferred location.

15. The non-transitory computer-readable medium of claim 14, wherein the location bias for the first transport provider comprises a location or subregion that is within at least one of a distance or a time of travel for allowing the first transport provider to arrive at the preferred location before the preference location time.

16. The non-transitory computer-readable medium of claim 9, wherein the executed instructions cause the computer system to determine the location bias by determining a stopping location and a stopping time for the first transport provider, and wherein the location bias changes as the stopping time approaches.

17. A computer-implemented method of operating a computer system, the method being performed by one or more processors and comprising:
  receiving, over one or more networks, transport service requests from computing devices of requesters within a geographic region;
  matching each transport service request with an available transport provider operating a service vehicle within the geographic region;
  determining a location bias for a first transport provider that operates a corresponding vehicle within the geographic region, the location bias being associated with a preferred location of the first transport provider; and
  matching the first transport provider to a transport service request based on (i) the location bias of the first transport provider, and (ii) a destination of the transport service request which, upon fulfilling the transport service request, results in the first transport provider being positioned to arrive at the preferred location within a future time interval.

18. The method of claim 17, wherein determining the location bias to furthers an objective of the first transport provider.

19. The method of claim 18, wherein the objective of the first transport provider comprises maximizing a number of transport assignments that the first transport provider receives over a given time period.

20. The method of claim 18, wherein the objective of the first transport provider comprises maximizing revenue for the first transport provider over a given time period.

* * * * *